Patented June 8, 1937

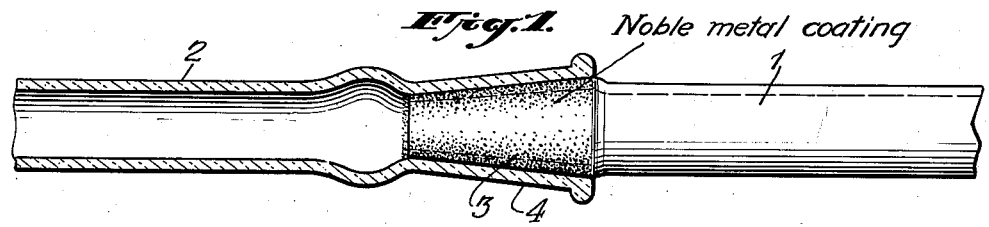
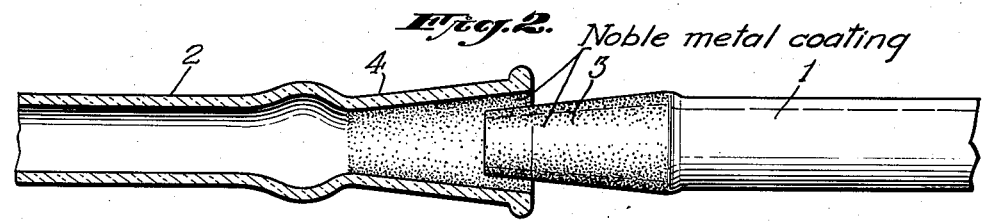
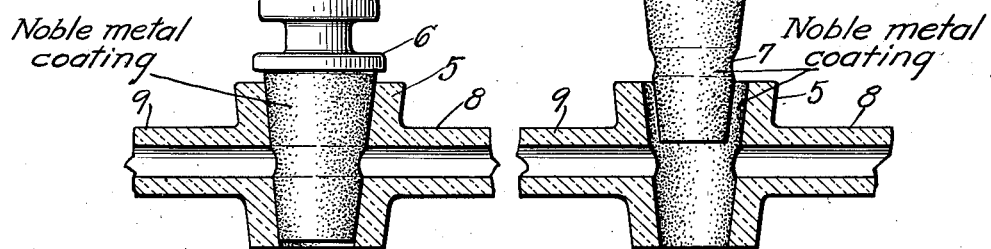
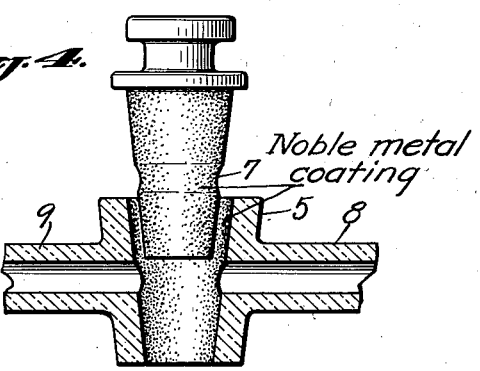
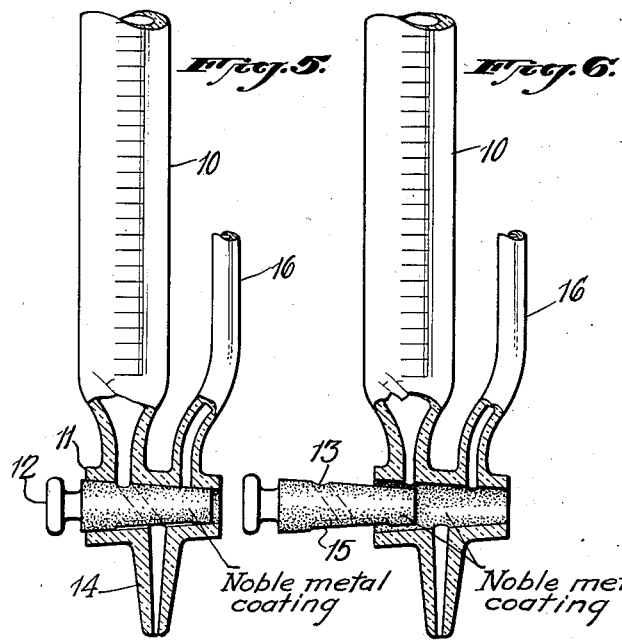
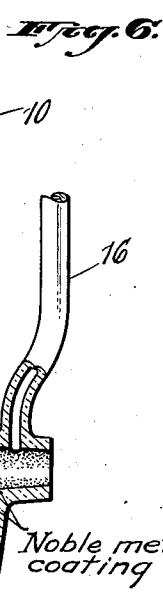
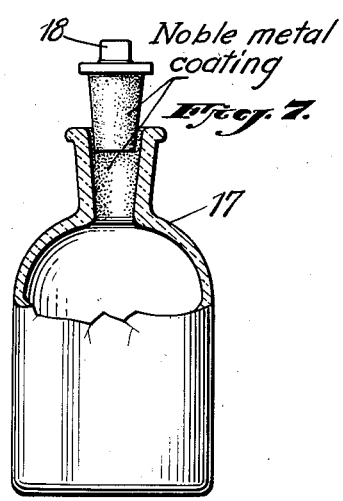
INVENTOR.
WILLIAM O. GEYER.

2,083,228

UNITED STATES PATENT OFFICE 2,083,228

CHEMICAL APPARATUS

William O. Geyer, Bloomfield, N. J.

Application March 2, 1936, Serial No. 66,523

12 Claims. (Cl. 23—292)

This invention relates to physical and chemical apparatus and more particularly to sealed joints, movable and immovable, utilized therein such as tubular joints, unions, stop-cocks, stoppers and the like.

Physical and chemical apparatus is usually constructed or comprised of glass, porcelain and the like non-metallic materials. Heretofore in the art it has been customary to employ complementary tapered annular male and female surfaces in the forming of such joints. The engaging tapered surfaces are seated together by grinding. The particular taper employed may vary widely and the extent of surfaces annularly engaged may also vary widely. Where free relative movement is desired between said surfaces, as in stop-cocks, it is customary to employ various lubricating materials of hydrocarbon base such as vaseline, for example. Where hermetic sealing is desired between the two surfaces various other kinds of lubricating compounds having a rubber base, for example, have been proposed. When such lubricating materials cannot be employed it is possible by extreme care in grinding and seating the two surfaces together to obtain a relatively liquid and gas tight seal therebetween.

However, such a seal or joint whether used with or without lubricating materials has certain disadvantages which it is the main object of the present invention to eliminate.

It is known that various chemicals, liquid and gases, have the tendency to react with the two ground surfaces even when non-reactive with the unground surfaces due to the phenomena known in the art as "contact corrosion". This causes undesirable contamination in the said chemical and further causes deterioration of the ground surfaces and the sealing properties thereof. Frequently the joint becomes frozen tight and the desirable detachability of the parts destroyed. The use of lubricating materials between the parts does not necessarily prevent this corrosion and in many cases is undesirable in both chemical and physical apparatus. Such lubricating materials frequently contaminate the chemicals, liquid or gaseous, flowing through the said joint or have sufficient vapor pressure to contaminate atmospheres, at normal or reduced pressures, that may be contained within physical apparatus utilizing the said joint.

One of the objects of the present invention, therefore, is to provide an improved joint for chemical and physical apparatus. Another object is to provide a relatively inert engaging surface for said joint. Still another object is to provide the engaging surfaces of said joints with a substantially inert coating of material serving to permit relative free movement between said surfaces and to join said surfaces together in a hermetic and non-lubricated seal. Another object is to provide a coating for the engaging surfaces of joints in chemical and physical apparatus which is resistant to corrosion and substantially free from soluble and vaporizable substances contaminating towards liquids and gases passing through said joints. Other objects and advantages will become apparent as the invention is more fully disclosed.

In accordance with the above objects I have discovered that by coating at least one of the engaging or contacting tapered surfaces of said joint, unions, stop-cocks, stoppers and the like with a metal having the character of a noble metal the said surfaces are protected from attack by gases and liquids passing through the said joint and that the application of lubricating materials to the said surfaces to permit relative movement of the said surfaces or to provide hermetic sealing of said surfaces may be dispensed with if desired. By the term noble metals are included particularly gold, silver, platinum, palladium and other metals of the platinum group and the various alloys of these metals. Other base and rare metals such as tin, zinc, tantalum, columbium and the like under special circumstances behave as noble metals and are accordingly to be considered as full equivalents of the said noble metals in the present invention.

Before further disclosing the present invention reference should be made to the accompanying drawing, wherein Fig. 1 illustrates a typical tapered tubular joint utilized in both chemical and physical apparatus, which joint as shown is improved in accordance with the present invention;

Fig. 2 illustrates the manner of engaging the same;

Fig. 3 illustrates a typical stop-cock improved in accordance with the present invention;

Fig. 4 is a second view of the same;

Fig. 5 illustrates a typical combination of chemical apparatus known as a burette which consists of a graduated tube arranged to be filled and emptied through a stop-cock. The stop-cock shown has been improved in accordance with the present invention;

Fig. 6 is a second view of the same; and

Fig. 7 is a view of a second typical piece of chemical apparatus, namely a bottle, utilizing a tapered ground joint for the stopper closing thereof, which joint has been improved in accordance with the present invention.

Referring to the drawing Figs. 1 and 2 illustrate the application of the present invention to one of the more common types of joints utilized in chemical and physical apparatus. Numerals 1 and 2 are tubular elements comprised of glass, porcelain or similar materials which are provided with complementary tapered end sections 3 and 4 respectively. This type of joint is usually referred to as tubular male and female joint.

Heretofore in the art it is customary to mechanically shape the two end sections 3 and 4 in such manner as to provide said parts with a tapered external and internal surface respectively, lying in substantially the same conical plane to the longitudinal axis of tubular elements 1 and 2. Thereafter it is customary to grind the said surfaces down until a substantially perfect joint or seal therebetween is obtained. It is usually necessary to apply lubricating material such as vaseline, for example, to this ground surface to insure fluid (gaseous or liquid) tight joining of the two surfaces and to permit ready rotation of the two surfaces relative to each other, and also to facilitate the disengaging of the parts when desired. Many other lubricating materials have been proposed for use in such a joint, some having one advantage and some another depending upon the particular service desired. Where a vacuum tight seal is desired a lubricant having a rubber base and evidencing a relatively low vapor pressure is customarily employed.

In accordance with the present invention I propose to eliminate the necessity of the use of such lubricating materials in such a joint while still retaining all the desirable features of the same and without their attendant disadvantages by providing the ground and tapered surfaces of the joint with a coating of a noble metal such as gold, platinum, palladium, silver or combinations and alloys thereof. This coating is preferably quite thin and just sufficient to effectively cover the said surface and to provide a bearing surface thereon for rotation of the surfaces relative to each other. Preferably also this coating is comprised of discrete particles of the said noble metal bonded securely to the tapered surface of the joint.

In applying the coating to the surfaces I preferably employ thermally decomposable organic compounds of the noble metals and paint the surfaces therewith one or more times and build up thereon by thermally decomposing the said compounds, a minimum number of layers of the said metal to a sufficient thickness for the purposes of the present invention. Alternatively I may electrically sputter the metal thereon or may electrolytically deposit the same thereon by any of the methods heretofore well known in the art.

It is apparent that the depth of coating required to coat any particular ground surface is substantially that necessary to build up the surface to a substantially even surface higher than the highest point in the said ground surface. A thin layer of deposited material in excess of this is all that is required to provide a suitable bearing surface for the free rotation of the two surfaces relative to each other. In fact, the higher burnished the surface becomes the better seal will be obtained therebetween and the better the deleterious feature of contact corrosion eliminated. Accordingly, whereas a relatively thin coating is effective for the main purposes of the present invention a layer of sufficient depth to provide a highly burnished surface is still more effective.

A still further improvement of the present invention may be obtained when the material from which the joint is formed is adapted to be molded or otherwise mechanically shaped under pressure to precise size and shape without thereafter grinding the engaging tapered surfaces to seat. The coating of noble metal thereafter applied to the tapered surfaces need be of only sufficient thickness to allow the same to be lightly ground and burnished to seat, to obtain the hermetic non-seizing joint desired.

Referring to Figs. 3 and 4, I have illustrated a typical stop-cock modified in accordance with the present invention. The usual stop-cock is provided with a barrel 5 having a tapered recess and a tapered plug 6 seated therein. Tapered plug 6 is usually seated within the tapered recess of barrel 5 by grinding. Plug 6 is provided with a passageway 7 therethrough which may be aligned by rotation of the plug with tubes 8 and 9 sealed through barrel 5 and opening to the inner tapered surface of the said barrel 5. It is highly essential that the plug 6 be freely rotatable with the tapered recess of barrel 5 and it is customary to obtain this rotation by applying lubricating material such as vaseline to the ground tapered surfaces.

In accordance with the present invention I apply to each one or both of the tapered surfaces of the plug 6 and barrel 5 an adherent coating of a noble metal by any of the methods above identified of a depth at least sufficient to provide a bearing surface therebetween and am thereby able to freely rotate the plug within the recess without the application of lubricating materials thereto. This coating also provides protection against deterioration of the tapered surfaces of the plug 6 and barrel 5 by contact corrosion and eliminates contamination of the materials liquid and gaseous passing through the stop-cock. When utilized in physical apparatus especially in connection with evacuation devices the hermetic seal thereby obtained without the use of lubricant is highly advantageous.

Referring to Figs. 5 and 6 I have illustrated a combination typical in chemical apparatus known as a self-filling burette. This apparatus includes a graduated tube 10 opening at its bottom end into a two-way stop-cock 11. In one position of plug 12 of said stop-cock 11 as indicated in Fig. 5, liquid contained in said tube 10 flows through a bore 13 and through tip 14. In a second position of plug 12 liquid may flow by gravity through peripheral bore or groove 15 from tube 16 into graduated tube 10.

Such an apparatus is used in chemical determinations and the solutions contained in tube 10 are of known and calibrated strengths and purity. It is highly essential for accurate determinations that during the passage of the solution through the stop-cock 11, the solution will not be deteriorated or contaminated. It is accomplished by the practice of the present invention by coating the tapered surface of plug 12 and the tapered recess in stop-cock 11, in which the said plug is seated, with a noble metal as above described. A liquid tight seal and free rotation of the plug within the recess without the use of lubricant thereby is obtained.

Referring to Fig. 7, the bottle 17 is provided with a tapered recess opening and a tapered plug 18 closing said opening. It is usual to grind the tapered surfaces of the recess and plug 18, respectively, to seat the plug in the recess in liquid and gas tight relation. Such stoppers 18 are frequently difficult to remove after a time interval due to "freezing" either due to the absence of lubricating materials between the surfaces or to contact corrosion of the surfaces. By coating one or both of the tapered surfaces with a noble metal in accordance with the practice of the present invention this difficulty is substantially eliminated and a substantially non-freezing hermetic seal therebetween may be obtained.

In the practice of the present invention, I have found gold and platinum to be preferable for most purposes. Palladium and silver are to be considered substantial equivalents for these metals although silver has the disadvantage of being more readily oxidized and attacked by some gaseous and liquid reagents. For use in connection with most physical or chemical apparatus where corrosion and oxidation are not major factors these metals are substantial equivalents, however, to gold and platinum. As hereinabove identified, other metals not commonly classified as noble metals may serve as substantial equivalents of the more generally recognized noble metals under special conditions of use and by the term "noble metals", as it may be herein used, I mean to include these metals as well as those more generally recognized as noble metals.

Having fully described the present invention and given several specific embodiments of the same, it is apparent that there may be many modifications and adaptations made thereof and all such are contemplated as may fall within the scope of the following claims:—

What is claimed is:—

1. In combination, male and female elements each comprised of ceramic material and having complementary shaped annular surfaces adapting said male element to be received and seated in said female element, the engaging annular surfaces of each of said elements having an adherent coating of ductile metal, the thickness of said coating being adapted to provide a substantially smooth bearing seat on each of said surfaces.

2. In combination, male and female elements each comprised of ceramic materials and having complementary shaped annular surfaces adapting the elements to be seated one within the other, the engaging annular surfaces of each of said elements having an adherent coating of a ductile noble metal, the thickness of said coating being adapted to provide a substantially smooth bearing seat on said surface.

3. In combination, male and female elements each comprised of ceramic material and having complementary shaped annular surfaces adapting the elements to be seated one within the other, the engaging annular surfaces of each of said elements having an adherent coating of silver, the thickness of said coating being adapted to provide a substantially smooth bearing seat on each of said surfaces.

4. In combination, tubular male and female elements each comprised of glass and having complementary tapered annular surfaces adapting said male element to be received and seated in said female element, the engaging surfaces of each of said elements having an adherent coating of a ductile metal, the thickness of said coating being adapted to provide a substantially smooth bearing seat on said surface.

5. In combination, tubular male and female elements each comprised of glass and having complementary tapered annular surfaces adapting said male element to be received and seated in said female element, the engaging surfaces of each of said elements having an adherent coating of a ductile noble metal, the thickness of said coating being adapted to provide a substantially smooth bearing seat on said surface.

6. In combination, tubular male and female elements each comprised of glass and having complementary tapered annular surfaces adapting said male element to be received and seated in said female element, the engaging surfaces of each of said elements having an adherent coating of silver, the thickness of said coating being adapted to provide a substantially smooth bearing seat on each of said surfaces.

7. A stop-cock having a glass barrel provided with a tapered annular recess and a correspondingly tapered glass plug seated within said recess, each engaging tapered surface of the said barrel and plug being coated with an adherent layer of a ductile noble metal, the thickness of said coating being adapted to provide a substantially smooth bearing seat on each of said surfaces.

8. A stop-cock having a glass barrel provided with a tapered annular recess and a correspondingly tapered plug seated within said recess, each engaging tapered surface of said barrel and plug being coated with an adherent layer of silver, the thickness of said coating being adapted to provide a substantially smooth bearing seat on each of said surfaces.

9. A bottle having a tapered annular stopper opening and a correspondingly tapered stopper seated within said opening, said bottle and stopper each being comprised of glass, each of the engaging tapered surfaces of the said opening and stopper being coated with an adherent layer of a ductile noble metal, the thickness of said coating being adapted to provide a substantially smooth bearing seat on said surface.

10. In chemical and physical apparatus, means to join together two apparatus parts, said means comprising a male element on one of said parts, a female element on the other of said parts, each of said elements being comprised of glass and having complementary tapered annular surfaces adapting the male element to be received and seated within said female element, and an adherent layer of a ductile metal on each of said tapered surfaces, said layer having a thickness adapted to provide substantially smooth opposing bearing seats for said elements.

11. In chemical and physical apparatus, means to join together two apparatus parts, said means comprising a male element on one of said parts, a female element on the other of said parts, each of said elements being comprised of glass and having complementary tapered annular surfaces adapting the male element to be received and seated within said female element, and an adherent layer of a ductile noble metal on each of said tapered surfaces, said layer having a thickness adapted to provide substantially smooth opposing bearing seats for said elements.

12. In chemical and physical apparatus, means to join together two apparatus parts, said means comprising a male element on one of said parts, a female element on the other of said parts, each of said elements being comprised of glass and having complementary tapered annular surfaces adapting the male element to be received and seated within said female element, and an adherent layer of silver on each of said tapered surfaces, said layer having a thickness adapted to provide substantially smooth opposing bearing seats for said elements.

WILLIAM O. GEYER.